United States Patent [19]

Adams et al.

[11] 4,074,830
[45] Feb. 21, 1978

[54] COMPRESSED AIR SEED PLANTER

[75] Inventors: Charles E. Adams, Mill Creek; Harold E. Quackenbush, La Porte; Paul H. Harrer, La Porte; Le Roy Langford, La Porte, all of Ind.; Alvin L. Cleek, Wauwatosa, Wis.

[73] Assignee: Allis-Chalmers Corporation, Milwaukee, Wis.

[21] Appl. No.: 508,672

[22] Filed: Sept. 23, 1974

[51] Int. Cl.² .............................................. A01C 7/04
[52] U.S. Cl. .................................... 221/266; 111/77; 221/278
[58] Field of Search ....................... 221/211, 266, 278; 111/77, 78

[56] References Cited

U.S. PATENT DOCUMENTS

| | | | |
|---|---|---|---|
| 2,991,909 | 7/1961 | Lamazou et al. | 221/211 |
| 3,731,842 | 5/1973 | Schlegel | 221/278 |
| 3,796,346 | 3/1974 | Ribouleau | 221/211 |
| 3,888,387 | 6/1975 | Deckler | 221/278 |

FOREIGN PATENT DOCUMENTS 1,457,515  9/1966  France ................. 221/266

Primary Examiner—Robert B. Reeves
Assistant Examiner—Francis J. Bartuska
Attorney, Agent, or Firm—Charles L. Schwab

[57] ABSTRACT

A rotating disc has perforated seed pockets which pick up individual kernels of seed from a cavity of a planter housing. Bulk seed flows by gravity from a hopper to the cavity which is pressurized by a blower. As the disc rotates through the cavity, air flowing through the perforated pockets will move the seeds into the pockets and hold them there as the disc rotates to bring the seed carrying pockets into axially confronting relation with a flat sealing surface. The flat sealing surface holds the seed in the pockets as the disc rotates further to a position wherein the pockets are exposed to an open bottom area of the housing at which point the seeds are free to fall by gravity into the soil.

1 Claim, 18 Drawing Figures

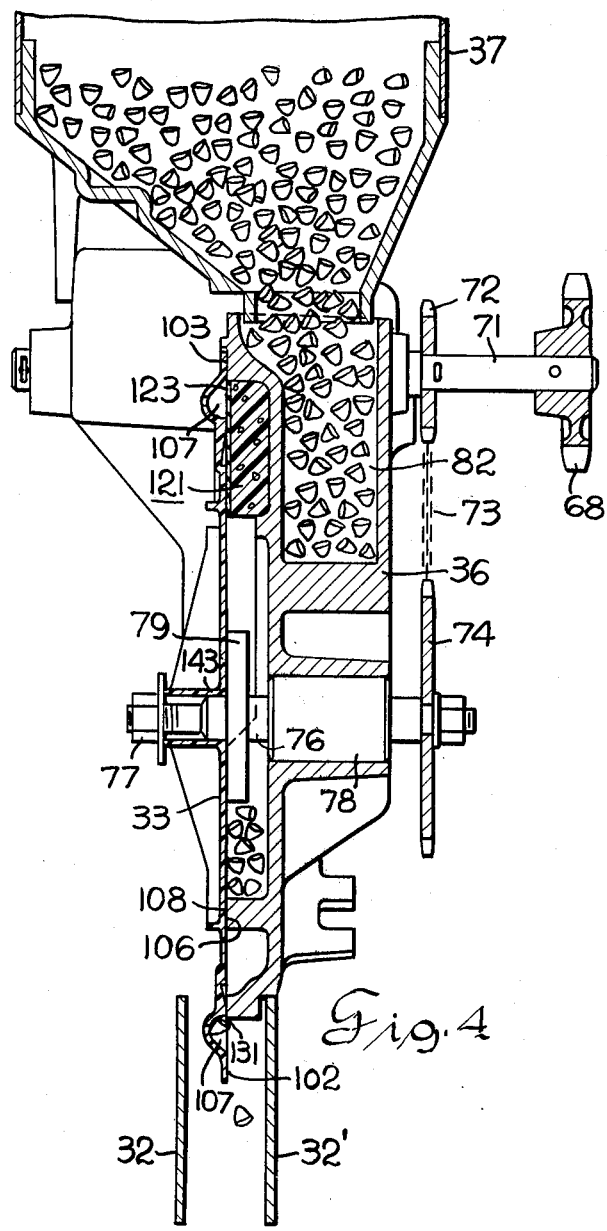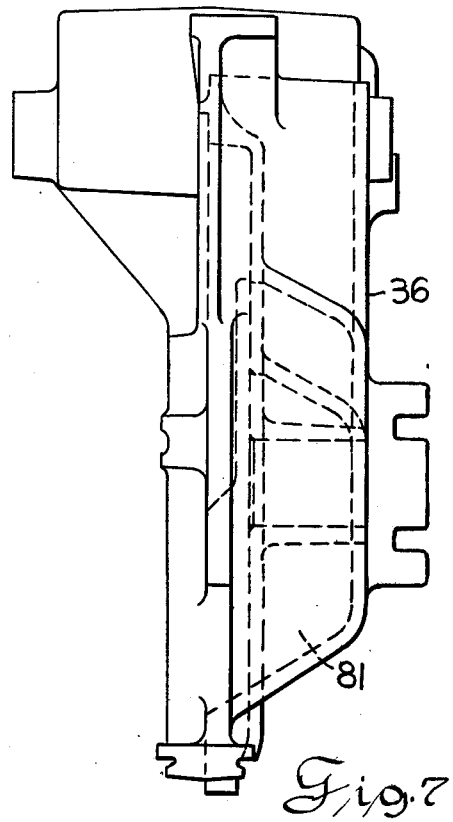

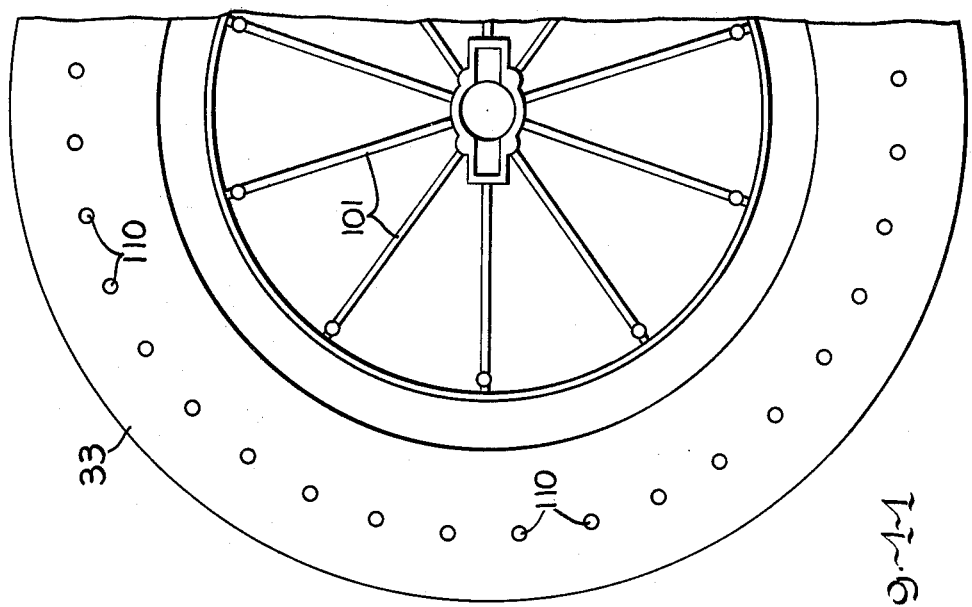
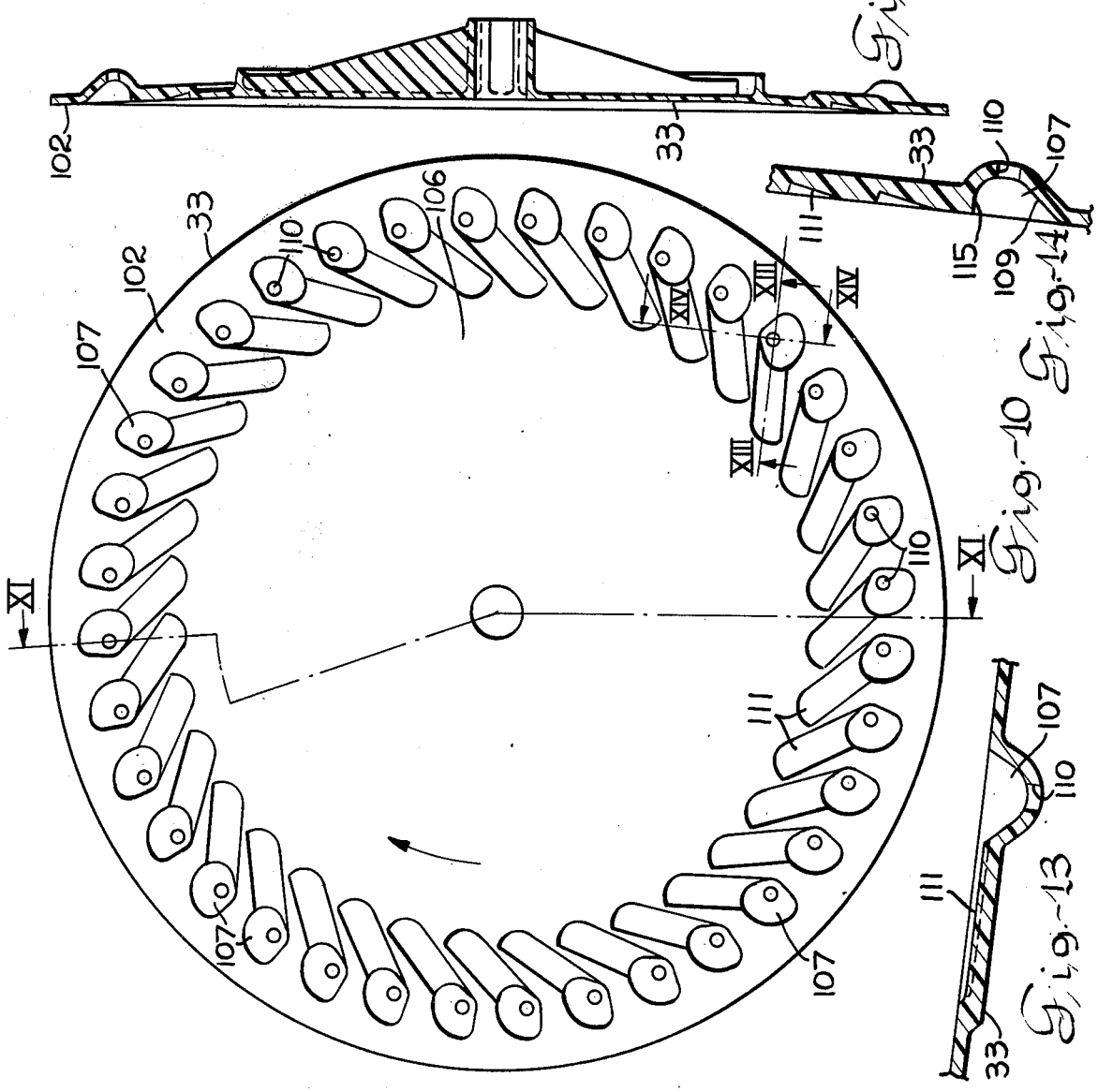

COMPRESSED AIR SEED PLANTER

RELATED APPLICATIONS

A seed planting disc for the air planter of this invention is shown and claimed in a copending U.S. patent application of Paul H. Harrer and LeRoy Langford for Seed Disc for an Air Planter.

BACKGROUND OF THE INVENTION

The use of air pressure or vacuum to induce separation of kernels of grain from a bulk quantity has been suggested in U.S. Pat. Nos. 792,958; 1,006,984; 1,046,199; 1,331,235; 1,762,671; 2,031,713; 2,384,820; 2,479,534; 2,525,718; 2,605,017; 2,737,314; 2,960,258; 2,986,305; 2,991,909; 2,995,274; 3,100,462; 3,133,676; 3,142,274; 3,156,201; 3,240,175; 3,322,080; 3,380,626; 3,387,746; 3,412,908; 3,434,437; 3,542,242; 3,608,787; 3,637,108; 3,680,373; 3,698,332; 3,721,842; 3,762,603 and 3,788,518 and British patent 802,899.

BRIEF SUMMARY OF THE INVENTION

Flowing air is used to trap the seeds in perforated pockets in a vertically disposed disc as the disc rotates by a housing cavity containing seed. After being picked up in the pockets, the seeds are kept in the pockets by a resilient pad with a flat surface engaging the disc as the latter rotates the seed carrying pockets out of the cavity. The seed carrying pockets then pass to an open area at the bottom of the housing where they fall directly into the soil without the aid of air pressure or mechanical devices. Seeds flow by gravity into the housing cavity and the cavity is pressurized by a suitable air blower. As the disc rotates the pockets pass upwardly beside the cavity and are exposed to the seeds therein. The air passing from the cavity by way of the perforated pockets induces the seeds to be drawn into the pockets and the seeds are held in the pockets by the pressure differential between the cavity and the atmosphere.

BRIEF DESCRIPTION OF THE DRAWINGS

The present invention is illustrated in a series of drawings wherein:

FIG. 4 is a section view taken along line IV—IV in FIG. 3;

FIG. 7 is a rear view of the housing shown in FIG. 5;

FIG. 8 is a section view taken along the lines VIII—VIII in FIG. 5;

FIG. 10 is a side view of a corn planting disc usable in the present invention;

FIG. 11 is a section view taken along the lines XI—XI in FIG. 10;

FIG. 12 is a side view of the corn planting disc from the opposite side as FIG. 10;

FIG. 13 is a section view taken along the lines XIII—XIII in FIG. 10;

FIG. 14 is a section view taken along the lines XIV—XIV in FIG. 10;

DETAILED DESCRIPTION OF THE DRAWINGS

Figure 1:
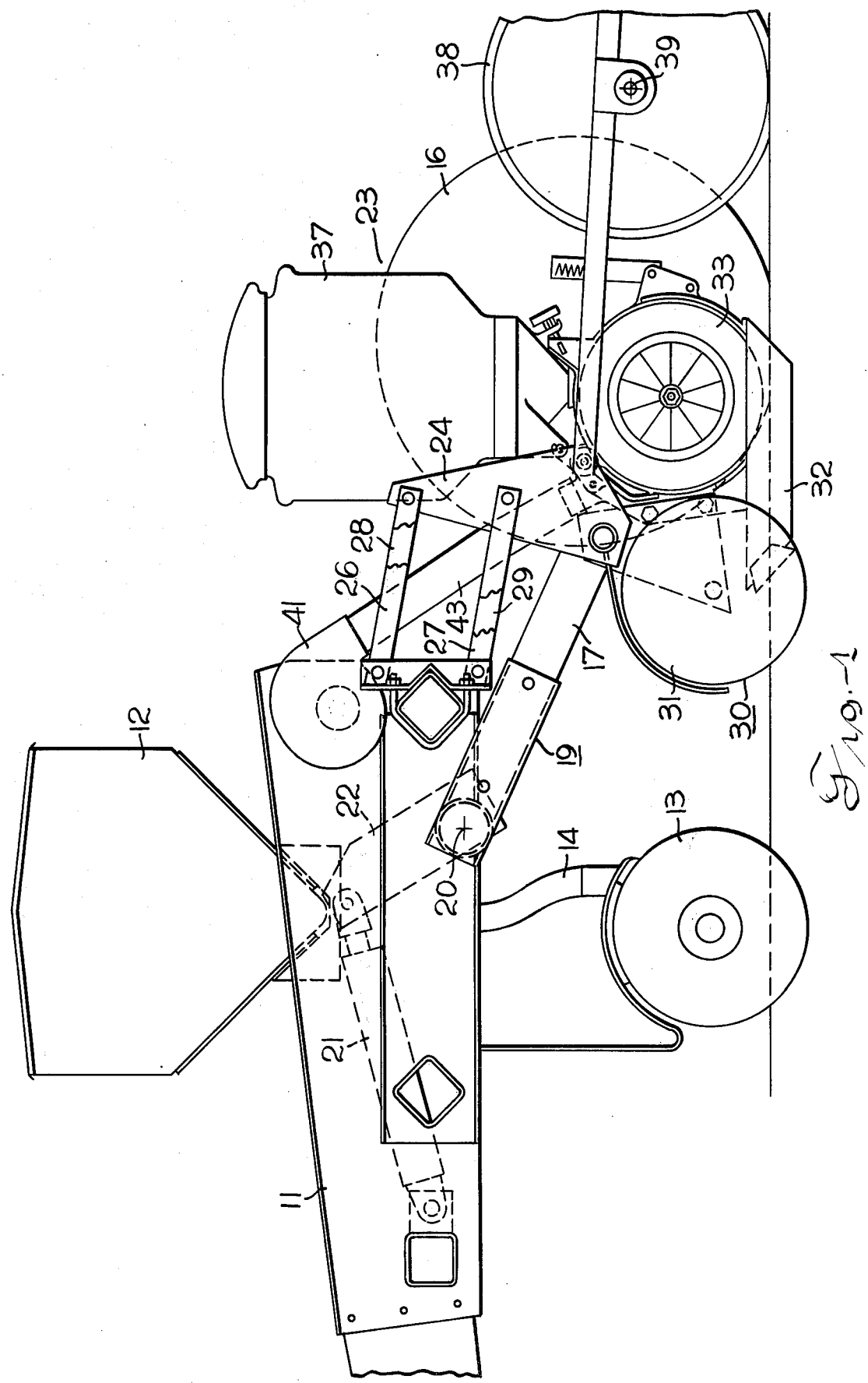
FIG. 1 is a side view of a planter incorporating the present invention.
Figure 2:
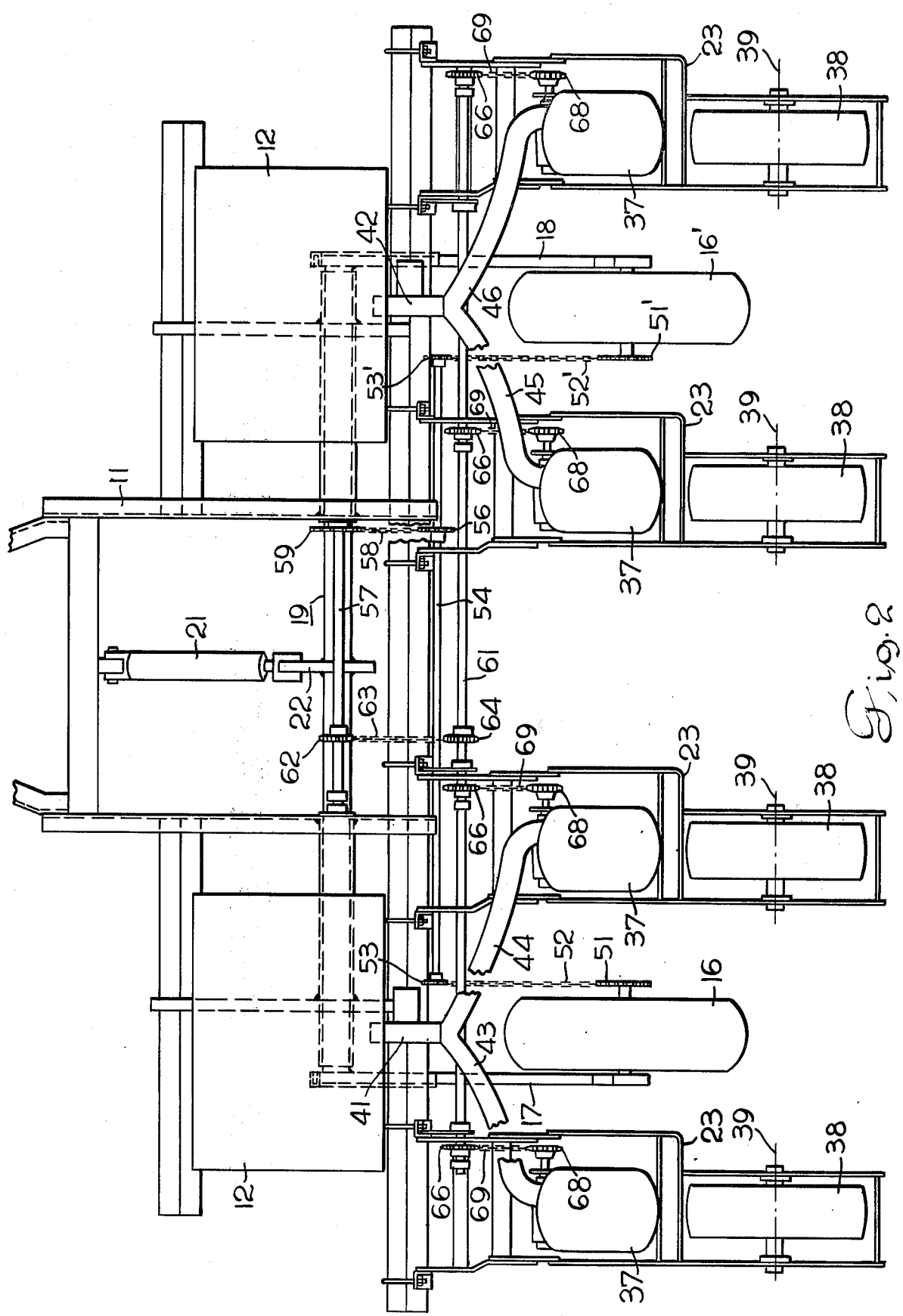
FIG. 2 is a top view of the planter shown in FIG. 1.
Figure 3:
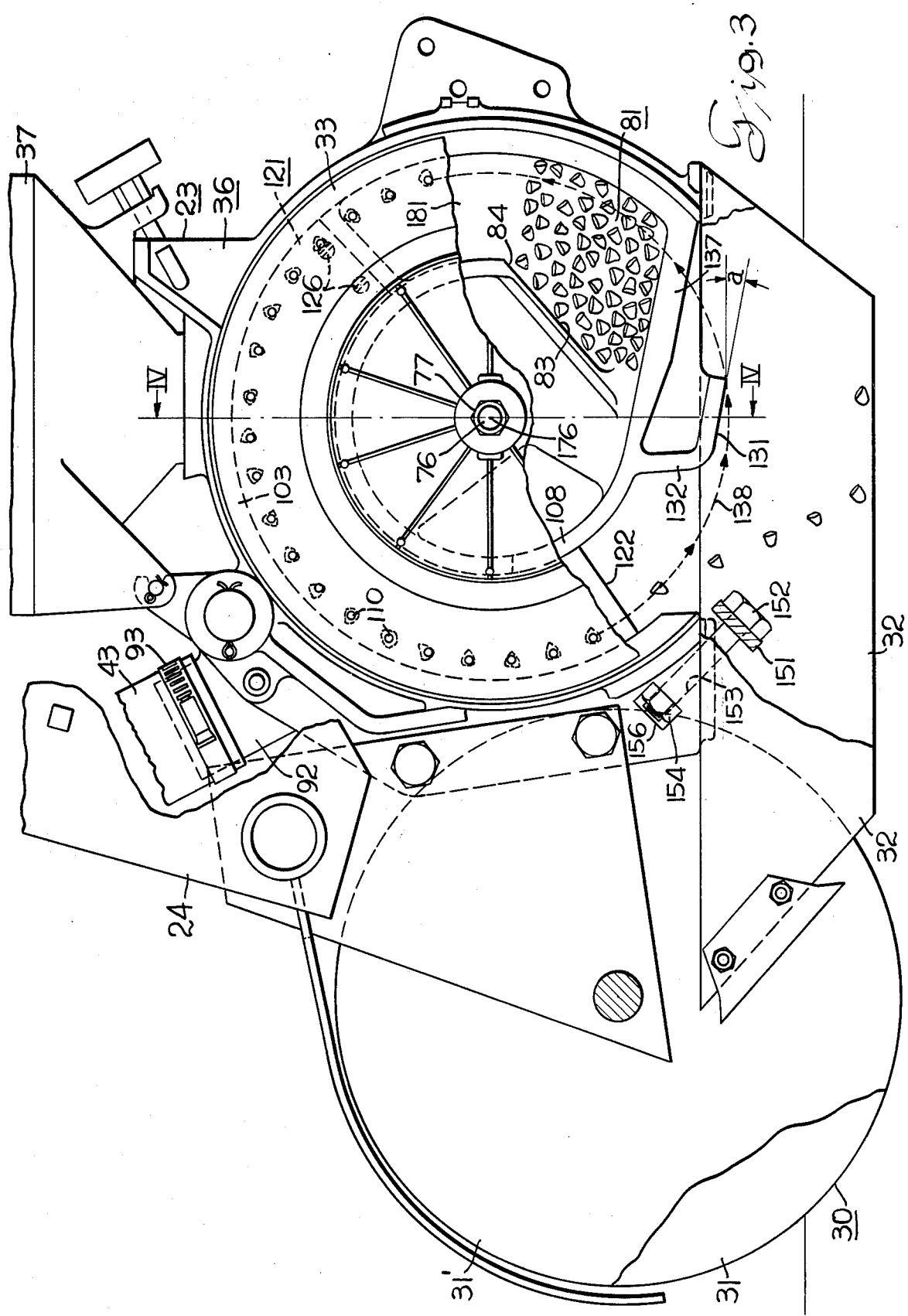
FIG. 3 is an enlarged side view of one planter unit of the planter shown in FIG. 1.
Figure 5:
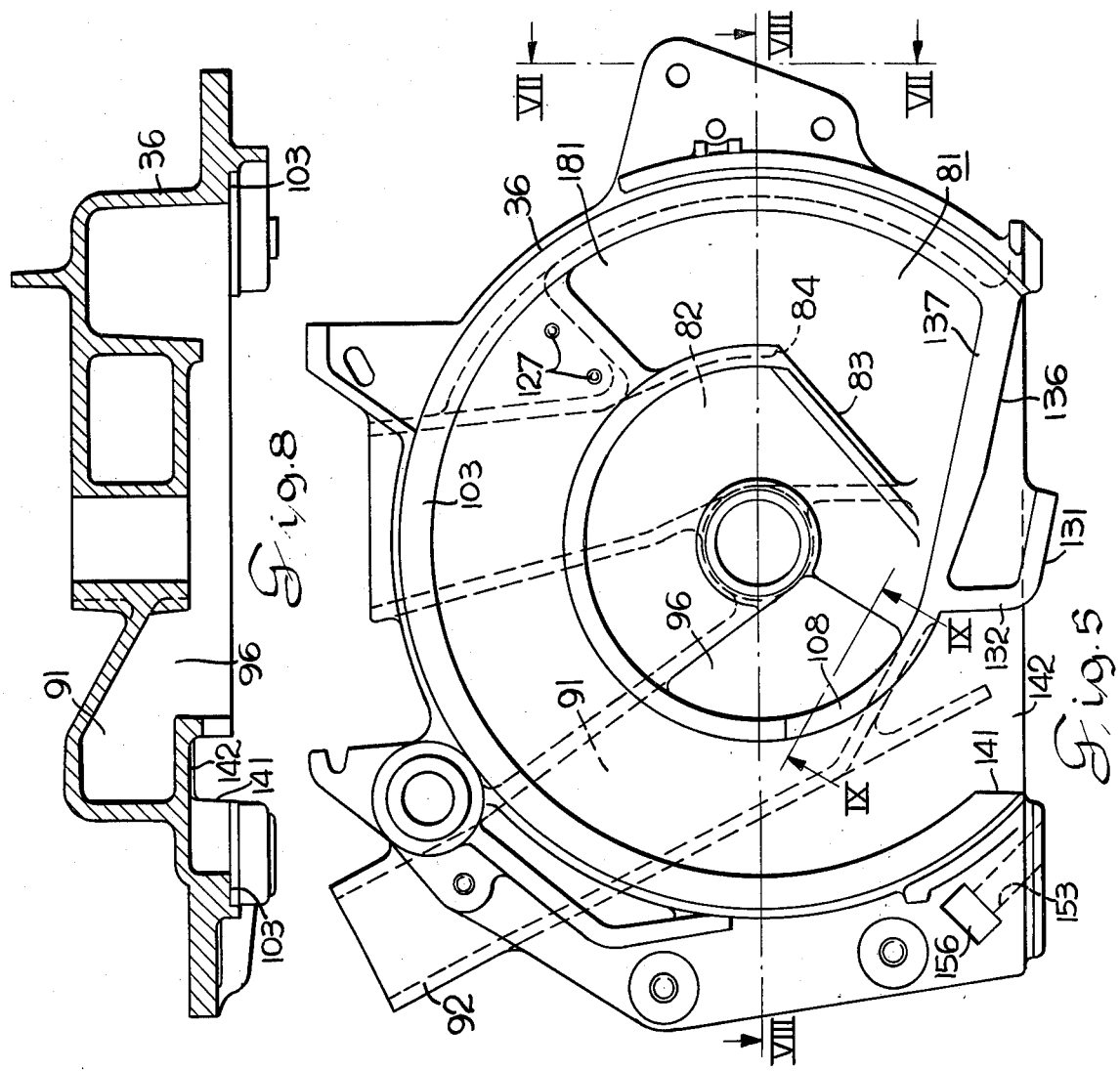
FIG. 5 is a side view of the housing part of the planter unit of the present invention.
Figure 9:
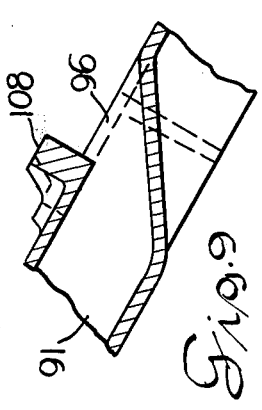
FIG. 9 is a section view taken along the lines IX—IX in FIG. 5.
Figure 6:
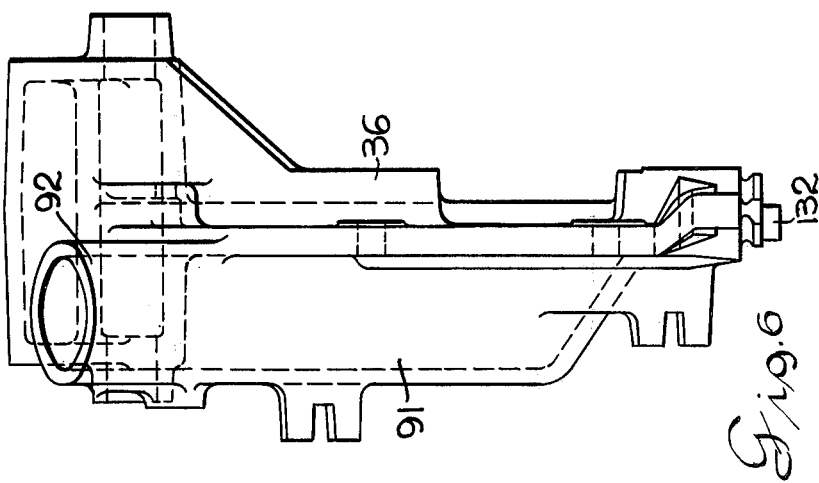
FIG. 6 is a front view of the housing shown in FIG. 5.
Figure 17:
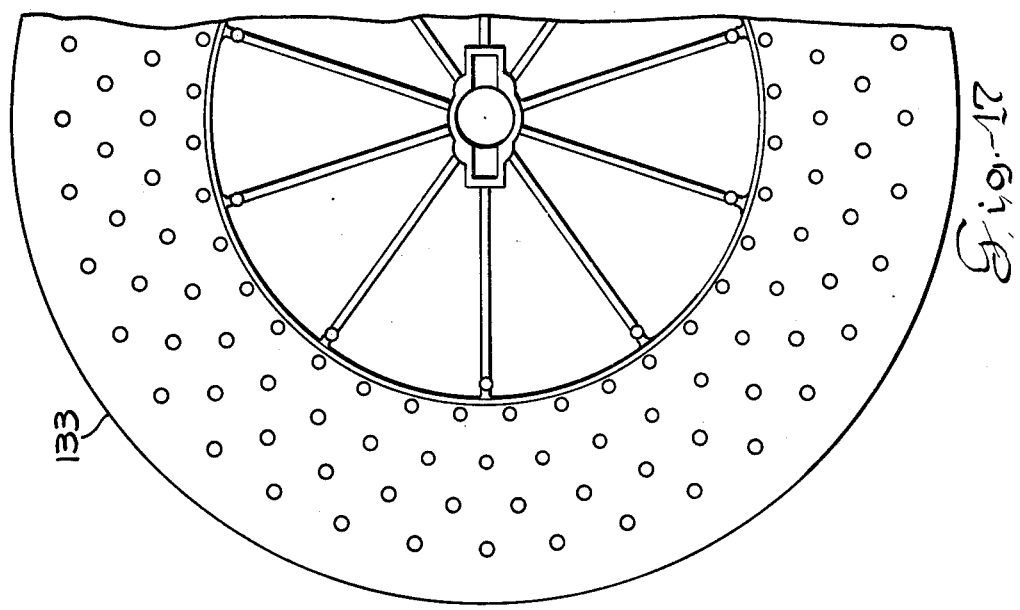
FIG. 17 is a side view of the soybean planting disc shown as seen from the opposite side from FIG. 15.
Figure 16:
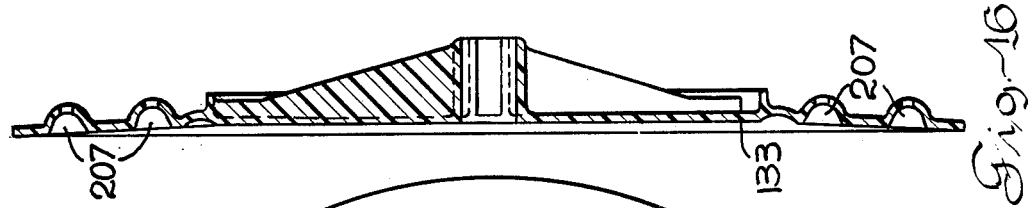
FIG. 16 is a section view taken along the lines XVI—XVI in FIG. 15.
Figure 15:
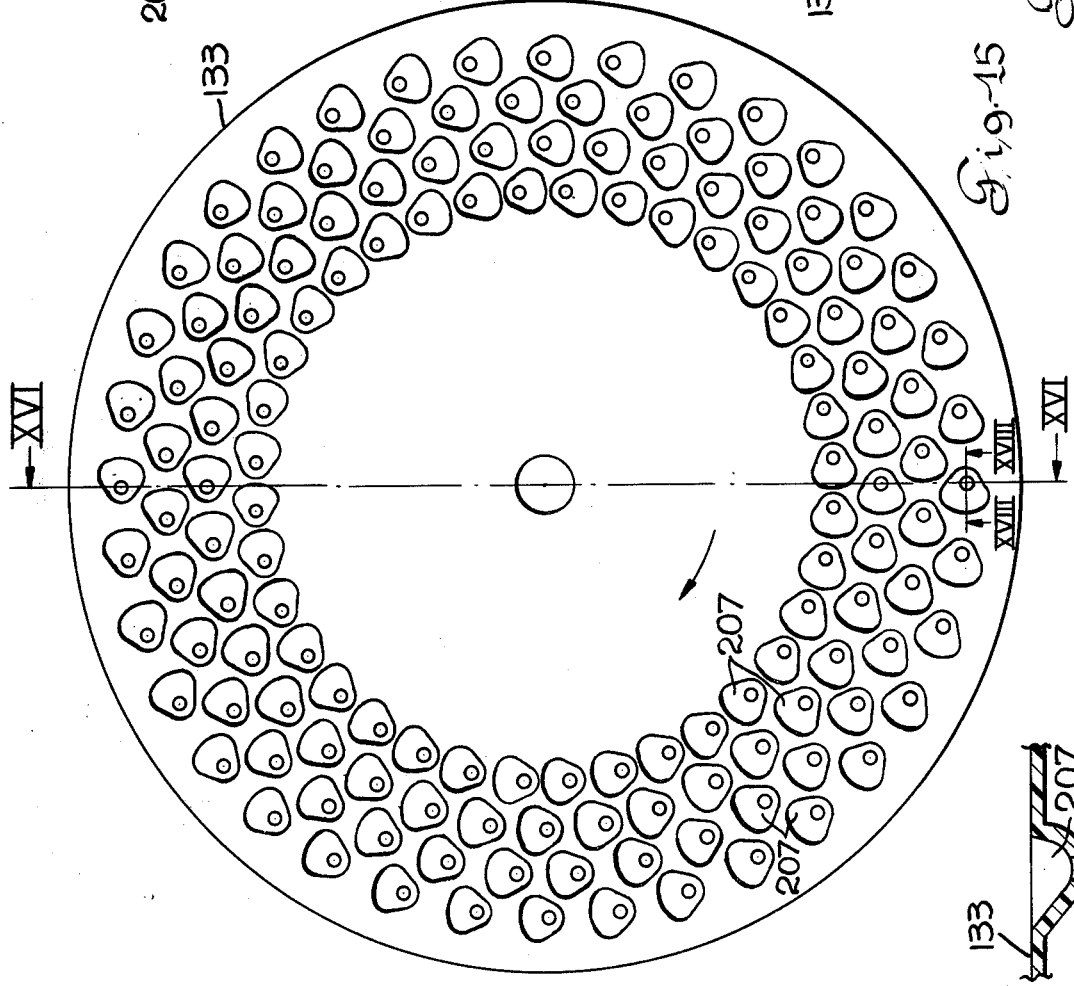
FIG. 15 is a side view of a soybean planting disc usable in the present invention.
Figure 18:
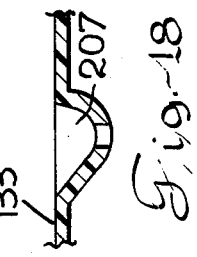
FIG. 18 is a section view taken along the lines XVIII—XVIII in FIG. 15.

Referring to FIGS. 1, 2 and 3, the planter includes a main frame 11 on which a fertilizer hopper 12 is disposed which deposits fertilizer behind the furrow opener 13 by way of a tube 14. The furrow openers 13 are shown in FIG. 2 and form no part of the present invention. Wheels 16, 16' are rotatably mounted on ends of legs 17, 18 of a lift frame 19 which is pivotably positioned about an axis 20 by a hydraulic ram 21 interconnected between the frame 11 and an arm 22 of the lift frame 19. The wheels 16 not only support the planter, but also, on expansion of ram 21, raise planting units 23 out of their planting position in which is illustrated. A planting unit subframe 24 is connected to main frame 11 by substantially parallel links 26, 27, 28, 29. A suitable disc-type furrow opener structure 30 is provided for the planting unit 23 and includes a pair of disc 31, 31' and a pair of transversely spaced runners or shoes 32, 32'. The shoes have their longitudinally central portions disposed on opposite sides of a seed planting disc 33 and converge at their front ends which carry scrapers for the inner, confronting sides of disc 31, 31'. The subframe 24 carries a housing 36 and a seed hopper 37. A press wheel 38 is mounted in trailing relation to the subframe 24 on a transverse axis 39 and serves to close the seed planting furrow to cover the seed. A pair of blowers 41, 42 mounted on frame 11 supply air to the housing 36 by way of suitable conduits 43, 44, 45, 46.

As shown in FIGS. 2 and 4, the seed planting discs 33 are ground driven by means of a power train which includes sprockets 51, 51' on wheels 16, 16' connected by endless drive chains 52, 52' to sprockets 53, 53' secured for rotation to a shaft 54. A sprocket 56 on the shaft 54 drives a parallel shaft 57 by means of an endless drive chain 58 in power transmitting relation to sprockets 56 and a sprocket 59 on the shaft 57. A third shaft 61 is parallel to shafts 54, 57 and is driven by shaft 57 by means of a sprocket 62 secured for rotation with shaft 57, a sprocket 64 connected for rotation with shaft 61 and a chain 63 operatively interconnecting the sprockets 62, 64. A sprocket 66 is provided on shaft 61 for each of the planter units 23 and each sprocket 66 is connected to a sprocket 68 on the associated planter unit 23 by a drive chain 69.

The sprocket 68 is nonrotatably connected to a shaft 71 to which a sprocket 72 is also nonrotatably connected. The sprocket 72 drives the disc 33 by means of a chain 73 and a sprocket 74, the latter being secured for rotation with a shaft 76 to which the disc 33 is secured by releasable fastening means in the form of a nut 77. The shaft 76 is mounted in the housing 36 by a suitable bearing 78 and includes an enlarged radial flange 79 in axially abutting relation to the disc 33.

As shown in FIGS. 3, 4, 5, 7 and 8, the housing 36 includes a cavity 81 into which seeds from the bulk seed hopper 37 flow by gravity by way of a downwardly extending seed passage 82 which is formed by walls in the housing 36. The upper lip 84 of a bottom opening 83 in passage 82 tends to regulate the height to which the grain will flow into the cavity 81. Pressurized air is delivered by blower 41 by way of the conduit 43 to the upper end 92 of an air delivery passageway 91 has a tubular configuration suitable for fastening to the conduit 43 by a band-type fastening member 93. As shown in FIGS. 5, 6, 8 and 9, the air delivery passageway 91 extends downwardly terminating in an opening 96 at the forward side of the cavity in which seed is deposited through the passage 82 from the seed hopper 37.

Referring again to FIG. 3, the side land shoes 32, 32' are interconnected by a bridging brace 151 welded at its transversely opposite ends to the confronting sides of the plates 32, 32' and the assembly thus formed is held in place on the housing 36 by releasable fastening means in the form of a bolt 152 extending through opening 153 in the housing 36 and a nut 154 disposed in a rectangular shaped window 156 in the housing 36 and in threaded engagement with the bolt 152.

Referring to FIGS. 10, 11, 12, 13 and 14, the construction of a corn planting disc 33 is illustrated. The disc 33 is constructed of a relatively stiff flexible plastic material with radial ribs 101 to provide rigidity and strength for the central part of the disc. The radially outer part of the disc is somewhat more flexible to permit deflection of the disc from its slightly cupped shape as shown in FIG. 11 to a flatened installed condition as shown in FIG. 4 wherein the radially outer portion of the flat surface 102 confronting the housing 36 is in sealing engagement with a flat axially facing sealing surface 103. When installed, as shown in FIG. 4, the disc acts like a belleville washer to provide an axial force to insure sealing engagement with the housing. A plurality of circumferentially spaced seed pockets 107 are formed in the plate 33 on the side thereof in confronting relation with the cavity 81. An annular sealing area 106 is provided by surface 102 radially inwardly from the seed pockets 107. This sealing area 106 cooperates with a complementary sealing surface 108 formed on the housing in the area adjacent where the seed drops from the disc.

As shown in FIGS. 13 and 14, the seed pockets 107 each include a trailing edge 115 which is nearly perpendicular to the disc 33 and a leading edge which presents a gradually sloping surface 109. Each of the pockets is perforated through provision of an axial opening 110. For corn seed, it has been found desirable to provide seed loading assistance ramps 111 which extend axially in the direction of rotation and radially inwardly from the pockets 107. The seed loading assistance ramps 111 are tapered to increasing depth when moving from leading to trailing sides thereof. As shown in FIG. 10, the disc rotates in a clockwise direction and the seed loading assistance ramps 111 are in leading relation to the pockets 107 thereby tending to cam the grains into the pockets 107 as the disc moves upwardly through the grain deposited in cavity 81.

Referring to FIGS. 15, 16, 17 and 18, a seed planting disc 133 for soybeans is illustrated. It will be noted that the four circumferential rows of pockets 207 are somewhat similar in shape to those for the corn planting plates illustrated in FIGS. 10 through 13, except they do not have the seed loading assistance ramps 111. The alignment and spacing of the pockets 207 in soybean disc 133 is such that the seeds drop into the soil in spaced relation to one another in the direction of travel.

OPERATION

Referring to FIGS. 3 and 4, as the seed planting disc 33 rotates, the pockets pass upwardly by the seed cavity 81, at about the 4 o'clock position as viewed in FIG. 3, where a kernel of corn is induced to move into each pocket by air flowing from the pressurized cavity 81 to atmosphere by way of the opening 110 in each pocket 107. The trailing edge 115 of the pocket 107 being nearly horizontal, provides a shelf to support the seed kernel as the pocket moves upwardly.

As the disc continues its rotation, each pocket will move adjacent a flexible pad 121, at about the 1 o'clock position, which serves to retain the single kernel of seed in the pocket until the trailing edge 122 of the pad 121 is passed, at about the 8 o'clock position, at which point the seed drops into the furrow opened by disc 31, 31' and held open by vertically disposed shoes 32, 32' of furrow opener structure 30. The arcuate pad 121 is made of suitable flexible plastic material of uniform thickness with a flat surface 123 confronting the pockets 107 which is provided by a layer of tough plastic having good wearing characteristics. As shown in FIG. 3, the pad 121 is fastened to the housing by a pair of screws 126 threadedly engaging drilled and tapped openings 127 (shown in FIG. 5). As shown in FIG. 4 the resilient pad 121 has been compressed to a reduced thickness. The pad serves to seal the cavity 81 by its engagement with the disc 33 between the housing sealing surfaces 103 and 108. The bottom of the cavity 81 is closed by sealing engagement between the disc 33 and an axially facing sealing surface 137 on flange 136 extending radially inward from sealing surface 103 to sealing surface 108. Actually the sealing surfaces 103, 137 and 108 are continuous and lie in the same vertical plane.

In the event a kernel of seed is lodged or stuck in the pocket 107, a slanting seed dislodging edge 131 on spur flange 132 will serve to cam the seed loose if a portion thereof extends from the pocket 107. The loosened seed will have time to drop as the pocket 107 moves from the spur flange 132 to the sealing flange 136. The seed dislodging edge intersects the circle 138 in which the pockets rotate about the axis 176 of shaft 76 at an acute angle "a." FIG. 4 shows the stuck seed moving into engagement with the seed dislodging edge 131.

During operation, the disc 33 closes the cavity 81 on one axial side thereof through its sealing contact with the surface 123 of the pad 121 and the sealing surfaces 103, 137 and 108 on the housing 36. It will be noted on reference to FIGS. 5 and 8, that walls 141, 142 and flange 132 form an open seed drop portion at the bottom of the housing 36 which is not pressurized and through which the seeds drop into the furrow.

During planting operation each pocket 107 moves upward alongside the seed containing cavity 81 disposed in the lower rear of the housing. The pocket 107 thence moves upwardly past the seed containing part of cavity 81 into a vacated upper chamber 181 of the cavity where any kernels of seed in excess of one have an opportunity to drop out of the pocket before the pocket moves into confronting relation with the sealing surface 123 of pad 121.

It is relatively easy to change from a corn planting disc 33 to a soybean planting disc 133, because the disc can be removed axially from the housing and shaft 76 upon removal of the releaseable fastening member in the form of nut 77. The vertically disposed shoes 32, 32' need not be removed. After the disc 33 is shifted axially to the left, as viewed in FIG. 4, sufficiently to move it off the pilot portion 143 of the shaft 76, it may be tilted axially outward at its top and lifted upwardly and outwardly.

The embodiments of the invention in which an exclusive property or privilege is claimed are defined as follows:

1. An air planter unit comprising:
    a housing having
        a seed receiving cavity,
        a first flat axial facing arcuate sealing surface,
        a second flat axially facing sealing surface extending from one circumferential end of said first sealing surface radially inwardly, said sealing surfaces at least partially circumscribing said cavity,
        a seed passageway connected at one end to said cavity and adapted at its other end for connection to a seed hopper,
        an air passageway connected at one end to said cavity and adapted at its other end for connection to a source of pressurized air, and
        an open seed drop portion at its lower end,
    a vertically disposed seed planting disc rotatably mounted on said planter unit on a horizontal transverse axis in substantially concentric relation to said first sealing surface and having
        a substantially flat annular sealing surface on one axial side of said disc in sealing engagement with said sealing surfaces on said housing whereby said disc is disposed in enclosing relation to said cavity,
        a plurality of circumferentially spaced seed receiving pockets formed in said one axial side, said pockets being disposed on the radially inner side of said first sealing surface on said housing and said second sealing surface on said housing extending radially inwardly to a point at the radially inner side of said pockets, and
        wall means defining a small axial opening through the bottom of each of said pockets permitting escape of air from said cavity, said pockets and openings being proportioned to hold seed in said pockets under influence of pressurized air in said cavity, said pockets being out of communication with said cavity as the rotating disc brings them to said seed drop portion of said housing whereby said seed in each pocket is free to fall to the soil by gravity as said disc is rotated to bring the pockets into said drop portion, and
    a resilient sealing pad in sealing engagement with said disc disposed between the radially inner end of said second sealing surface and said first sealing surface near the other circumferential end of the latter.

* * * * *